United States Patent
Takeuchi et al.

(12)

(10) Patent No.: US 6,413,669 B1
(45) Date of Patent: Jul. 2, 2002

(54) MELT IMPREGNATION OF MIXED METAL OXIDE

(75) Inventors: Esther S. Takeuchi, East Amherst; Randolph A. Leising, Williamsville, both of NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 09/542,227

(22) Filed: Apr. 4, 2000

Related U.S. Application Data

(60) Provisional application No. 60/137,384, filed on Jun. 3, 1999.

(51) Int. Cl.[7] .............................................. H01M 10/24
(52) U.S. Cl. ................ 429/218.1; 429/219; 429/231.95
(58) Field of Search .............................. 429/218.1, 219, 429/231.5

(56) References Cited

U.S. PATENT DOCUMENTS

| | | | |
|---|---|---|---|
| 4,310,609 A | 1/1982 | Liang et al. ................. 429/194 |
| 4,391,729 A | 7/1983 | Liang et al. ................. 252/182 |
| 5,221,453 A | 6/1993 | Crespi ........................ 204/291 |
| 5,472,810 A | 12/1995 | Takeuchi et al. ............ 429/218 |
| 5,498,494 A | 3/1996 | Takeuchi et al. ............ 429/219 |
| 5,516,340 A | 5/1996 | Takeuchi et al. ............ 29/623.1 |
| 5,561,006 A | 10/1996 | Lecerf et al. ................ 429/218 |
| 5,670,276 A | 9/1997 | Takeuchi et al. ............ 429/219 |
| 5,695,892 A | * 12/1997 | Leising et al. .............. 429/219 |
| 6,130,005 A | * 10/2000 | Crespi et al. ................ 429/219 |
| 6,225,007 B1 | * 5/2001 | Horne et al. ................ 429/231.5 |

FOREIGN PATENT DOCUMENTS

| EP | 618630 A1 | 3/1994 |
|---|---|---|

* cited by examiner

*Primary Examiner*—Patrick Ryan
*Assistant Examiner*—M. Wills
(74) *Attorney, Agent, or Firm*—Hodgson Russ LLP

(57) ABSTRACT

The present invention is directed to a process for preparing a cathode active material consisting of a single phase of mixed metal oxide, such as a single phase silver vanadium oxide. The synthesis technique involves first heating the starting materials to melt a decomposable starting constituent. This first heating temperature is held for a period of time sufficient to enable the decomposable starting constituent to melt and completely flow throughout and within the other starting materials. Then, the thusly produced melt impregnated reaction admixture is preferably ground to ensure complete homogeneity of the starting materials, followed by heating to the decomposition temperature of the decomposable starting constituent. To finish the synthesis, the decomposed admixture is heated to an elevated temperature above the decomposition temperature to provide the single phase mixed metal oxide.

45 Claims, 7 Drawing Sheets

MELT IMPREGNATION OF MIXED METAL OXIDE

CROSS-REFERENCE TO RELATED APPLICATION

This application claims priority based on provisional application Serial No. 60/137,384, filed Jun. 3, 1999.

BACKGROUND OF THE INVENTION

1. Field of the Invention

The present invention generally relates to the conversion of chemical energy to electrical energy and, more particularly, to a synthetic method for the preparation of an improved cathode active material for nonaqueous electrolyte alkali metal electrochemical cells. The present synthetic method provides a cathode material which predominantly contains a single phase mixed metal oxide, such as a single phase silver vanadium oxide (SVO, $Ag_2V_4O_{11}$). An example of a discharge application using this material is an implantable cardiac defibrillator where a lithium electrochemical cell may run under a light load for extended periods of time interrupted from time to time by high rate pulse discharge. The lithium electrochemical cell having a cathode of a single phase active material provides improved discharge characteristics including energy density and pulse discharge energy with reduced voltage delay in comparison to a mixed phase mixed metal oxide cathode active materials.

2. Prior Art

U.S. Pat. No. 4,310,609 to Liang et al. and U.S. Pat. No. 4,391,729 to Liang et al., which are assigned to the assignee of the present invention and incorporate herein by reference, disclose the preparation of a mixed phase mixed metal oxide cathode active material, such as a mixed phase silver vanadium oxide, by a thermal decomposition reaction for use in a nonaqueous electrolyte alkali metal electrochemical cell. The thermal decomposition reaction begins with an initial heating of starting materials at 180° C. followed by a second heat treatment step at 360° C. Notably, the 180° C. step is only held long enough to bring the starting materials to thermal equilibrium, after which the sample is further heated directly to 360° C. The product mixed metal oxide cathode active material has been shown to have multiple phases. For example, when silver vanadium oxide is the intended active product phases other than the desired $\epsilon$-phase ($Ag_2V_4O_{11}$), including $\gamma$-phase ($Ag_{0.74}V_2O_{5.37}$) and $\beta$ phase ($Ag_{0.35}V_2O_{5.18}$) as well as unreacted starting materials, are produced.

U.S. Pat. No. 5,695,892 to Leising et al., which is assigned to the assignee of the present invention and incorporated herein by reference, describes the synthesis of a mixed phase mixed metal oxide, such as silver vanadium oxide, under an air atmosphere. When silver vanadium oxide is the intended product, the thermal synthesis profile consists of heating starting materials to 110° C. for several hours, followed by heating to 230° C. for 30 minutes, then 260° C. for two hours, then 300° C. for 16 hours, and finally 375° C. for at least 24 hours. This material displays multiple peaks in the differential scanning calorimetry (DSC) curve at 459° C., 533° C., and 544° C. due to the presence of multiple phases in the final product.

Thus, the various prior art synthesis techniques result in more than one reaction mechanism taking place or they result in incomplete reaction of the starting materials. When silver vanadium oxide is the intended product, in addition to the desired $\epsilon$-phase, $\gamma$-phase and $\beta$-phase active materials and the unreacted starting material of $AgVO_3$ are also known to be produced in varying quantities.

The publication "Lithium/Silver Vanadium Oxide Batteries with Various Silver to Vanadium Ratios", Takeuchi, E. S.; Piliero, P., J. Power Sources, 1987, 21, 133–141, details the discharge of lithium batteries containing silver vanadium oxide with differing ratios of silver to vanadium. This publication describes that preparation ratios of Ag:V of 0.76:2 (low silver) and 1:1 (high silver) give less capacity and distinctly different discharge voltage profiles than silver vanadium oxide prepared with a Ag to V ratio of 1:2. Thus, the delivered capacity and voltage profile of a lithium/silver vanadium oxide cell is dictated by the phases of silver vanadium oxide making up the cathode active material. A similar conclusion is reached for other mixed metal oxide active materials produced in thermal decomposition reactions. In other words, the phase make up of a silver vanadium oxide active material greatly effects the delivered capacity and the voltage profile of the resulting lithium electrochemical cell. With this in mind, a highly consistent single phase mixed metal oxide material and, in particular, a single phase silver vanadium oxide is desired as a cathode active material for lithium electrochemical cells so that the discharge properties of the cell may be predicted in a reliable fashion. Accordingly, the present invention is directed to the synthesis of single phase mixed metal oxide materials using a new synthesis technique.

SUMMARY OF INVENTION

The present invention is directed to a process for preparing a cathode active material consisting of a single phase mixed metal oxide, such as a single phase silver vanadium oxide. The synthesis technique involves first heating the starting materials to melt a decomposable starting constituent. This first heating temperature is held for a period of time sufficient to enable the decomposable starting constituent to melt and completely flow throughout and within the other starting materials. Then, the thusly produced melt impregnated reaction admixture is preferably ground to ensure complete homogeneity of the starting materials, followed by heating to the decomposition temperature of the decomposable starting constituent. To finish the synthesis, the decomposed admixture is heated to an elevated temperature above the decomposition temperature to provide the single phase mixed metal oxide.

When the thusly prepared cathode active material is coupled with a lithium anode, the predictability of the cell's discharge performance is greatly improved over that of prior art primary lithium cells containing mixed metal oxides of multiple phases and of unreacted starting materials. Silver vanadium oxide cathode material prepared by the present melt impregnation technique has been shown to be a single phase mixed metal oxide product material.

These and other aspects of the present invention will become more apparent to those skilled in the art by reference to the following description and to the appended drawings.

DETAILED DESCRIPTION OF THE PREFERRED EMBODIMENTS

Figure 1:
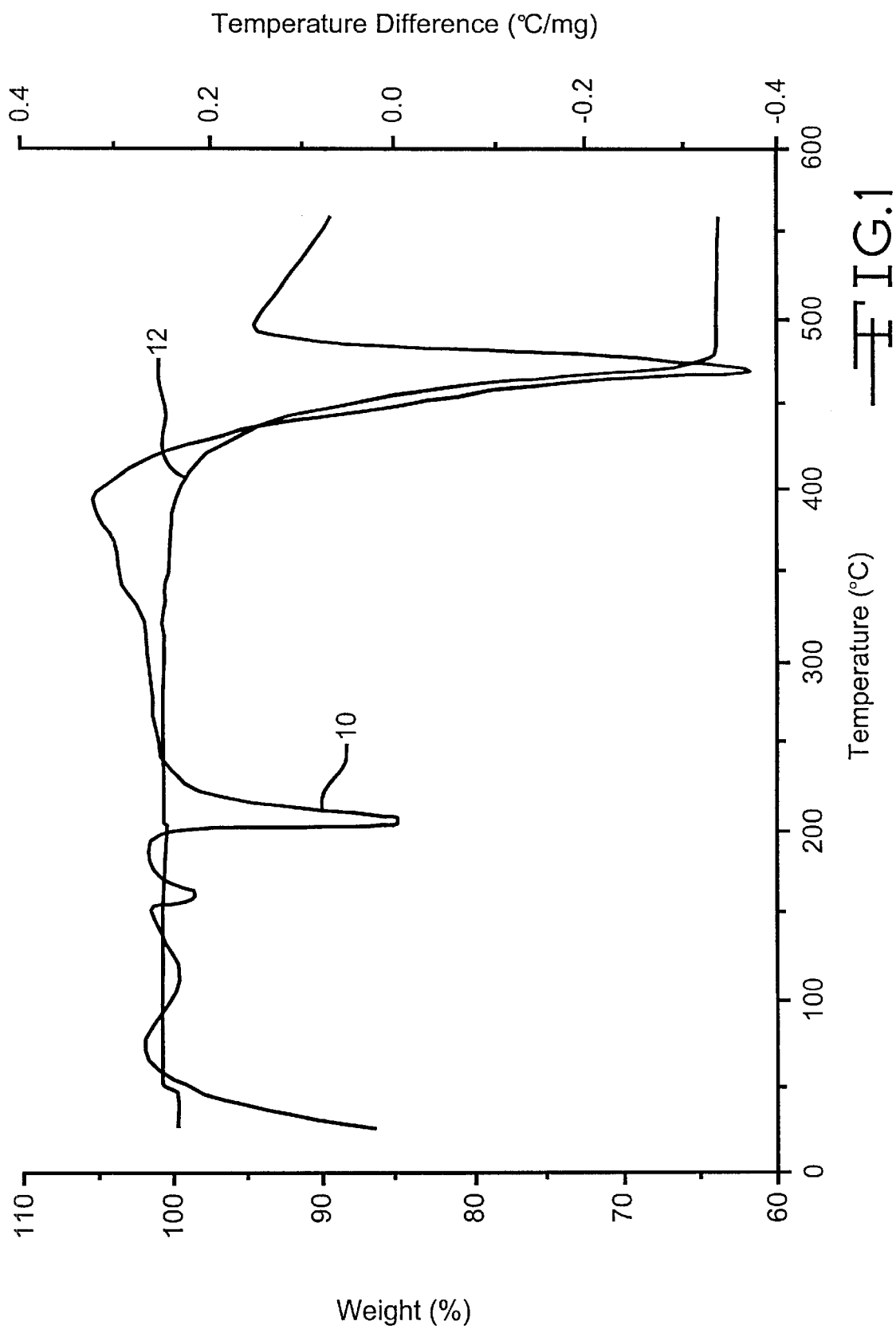
FIG. 1 is a graph constructed from the differential thermal analysis and thermal gravimetric analysis of silver nitrate.

An electrochemical cell including a single phase mixed metal oxide synthesized as an electrode active material, such as a cathode active material, according to the present invention preferably comprises an anode of a metal selected from Group IA of the Periodic Table of the Elements. This group of metals is collectively referred to as the alkali metals and comprises lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy, such as a lithium-aluminum alloy. However, the greater the amount of aluminum present by weight in the alloy, the lower the energy density of the cell.

The form of the anode may vary, but preferably the anode is a thin metal sheet or foil of the anode metal, pressed or rolled on a metallic anode current collector, i.e., preferably comprising nickel, to form an anode component. In the exemplary cell of the present invention, the anode component has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical reaction at the cathode involves conversion of ions which migrate from the anode to the cathode into atomic or molecular forms. The cathode material of the present invention comprises at least one single phase cathode active material formed from readily decomposable reactant constituent compounds consisting of metals from Groups IB, IIB, IIIB, IVB, VB, VIB, VIIB, as well as from Group VIII of the Periodic Table of the Elements. The decomposable reactant constituents are first mixed together in a substantially homogeneous mixture. The mixture is then heated to above the melting temperature of the lowest melting one of the starting constituents, but below its decomposition temperature, and held there for a period of time sufficient to have the melted starting constituent completely flow throughout and within the other starting materials. The melt impregnated reaction admixture is then ground to ensure homogeneity and subsequently thermally treated so as to effect the rapid preparation of the desired single phase mixed metal oxide cathode action material.

Thus, preferred single phase mixed metal oxides are prepared by thoroughly mixing vanadium oxide with a metal, a metal oxide or a decomposable metal compound of a second metal and possibly a third metal, wherein at least one of the second and third metals is a decomposable compound, for example a decomposable nitrate, nitrite or an ammonium salt compound, heated in an oxygen-containing atmosphere, such as air or oxygen. For the preparation of silver vanadium oxide, vanadium oxide is most preferredly in the form $V_2O_5$. This homogeneous mixture, having a substantially identical distribution of the reactant constituents throughout, is thereafter heated to the melting temperature of the decomposable metal-containing constituent, but below its decomposition temperature, and held at that temperature for an extended period of time. Following grinding, the melt impregnated admixture is thermally decomposed and then heated at an elevated temperature to form the resulting single phase mixed metal oxide. This results in the evolution of nitrogen oxide gas. Heating the melt impregnated admixture to the decomposition temperature preferably occurs in a multi-step or ramped-up heating process. A mixture containing carbonate compounds is characterized by the evolution of carbon dioxide. The decomposable reactant compounds may also comprise a metal sulfide instead of the decomposable nitrates, nitrites and carbonates. The second and third metals are most preferably selected from silver, copper and manganese.

Table 1 below lists a summary of thermal analysis data for various ones of the starting materials of the present invention.

TABLE 1

|  | Melting Point | Decomposition Starts |
|---|---|---|
| Silver Nitrate ($AgNO_3$) | 212° C. | 444° C. |
| Silver Carbonate ($Ag_2CO_3$) | 218° C. (d.) | — |
| Silver Nitrite ($AgNO_2$) | 140° C. (d.) | — |
| Silver Lactate ($AgC_3H_5O_3$) | 120° C. |  |
| Silver Triflate ($AgCF_3SO_3$) | 286° C. |  |
| Silver Pentafluoropropionate ($AgC_3F_5O_2$) | 242° C. |  |
| Silver Laurate ($AgC_{12}H_{23}O_2$) | 212° C. |  |
| Silver Myristate ($AgC_{14}H_{27}O_2$) | 211° C. |  |
| Silver Palmitate ($AgC_{16}H_{31}O_2$) | 209° C. |  |
| Silver Stearate ($AgC_{18}H_{35}O_2$) | 205° C. |  |
| Copper Nitrate | 114.5° C. | —$HNO_3$, 170° C. |
| Copper Carbonate | 200° C.–220° C. | — |
| Manganese Nitrate | 25.8° C. | 129.4° |
| Manganese Carbonate | (d.) | — |
| Silver Sulfide (acanthite) | tr. 175° C. | d. |
| Copper (II) Sulfide (covellite) | 103° C. | 220° C. (d.) |
| Manganese Sulfide | d. | — |
| Vanadium Oxide | 690° C. | 1,750° C. |
| Ammonium Metavanadate | d. | — |

(d.) - decomposes
(tr.) - transition point

Table 2 below lists a summary of the thermal analysis data for various decomposable mixtures of the starting materials set forth in Table 1.

TABLE 2

|  | Mole Ratio | Melting Point | Decomposition Starts |
|---|---|---|---|
| Silver Nitrate + Vanadium Oxide | 1:1 | 207° C. | 280° C. |
| Silver Carbonate + Vanadium Oxide | 1:1 | 190° C. (d.) | — |
| Silver Nitrite + Vanadium Oxide | 1:1 | 108° C. (d.) | — |
| Copper Nitrate + Vanadium Oxide | 1:1 | 82° C. | 117° C. |
| Copper Carbonate + Vanadium Oxide | 1:1 | 287° C. (d.) | — |
| Silver Nitrate, Copper Nitrate + Vanadium Oxide | 1:1:1 | 82° C. | ~200° C. |

(d.) - decomposes
(tr.) - transition point

A preferred single phase mixed metal oxide according to the present invention begins by thoroughly mixing silver nitrate with vanadium pentoxide. This mixture is first heated to about 2° C. to about 40° C. above the melting temperature of the mixture. In the case of silver-nitrate and vanadium pentoxide, the mixture is heated to about 220° C., which is about 13° C. above the melting temperature of the silver nitrate constituent. The mixture of starting materials is held at this temperature for about 5 hours to about 16 hours, or until the silver nitrate has completely melted to flow throughout and within the vanadium-containing compound. After thoroughly grinding the resulting melt impregnated admixture, the admixture is heated to the decomposition temperature of the decomposable constituent. Heating to the decomposition temperature of the decomposable constituent is preferably done in a step wise manner. Finally, the decomposed admixture is heated to a temperature of about 50° C. to about 250° C. above the decomposition temperature of the decomposable constituent for about 12 to 48 hours.

Equation I below represents the heating of silver nitrate and vanadium oxide at about 207° C. when the silver nitrate material melts, but before the decomposition reaction.

$$\text{At } 207° \text{ C.: } AgNO_3 + V_2O_5 \rightarrow AgNO_3(\text{liq}) + V_2O_5 \qquad (I)$$

The decomposition of silver nitrate in a mixture with vanadium pentoxide, with accompanying weight loss, begins at about 280° C. This is a much lower temperature than the temperature at which pure silver nitrate decomposes, i.e., at about 444° C. The decomposition of silver nitrate results in the formation of silver vanadium oxide and $NO_x$ gas.

Equation II below represents the decomposition reaction of silver nitrate and vanadium oxide at about 280° C.

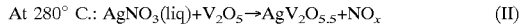

$$\text{At } 280° \text{ C.: } AgNO_3(\text{liq}) + V_2O_5 \rightarrow AgV_2O_{5.5} + NO_x \qquad (II)$$

Figure 2:
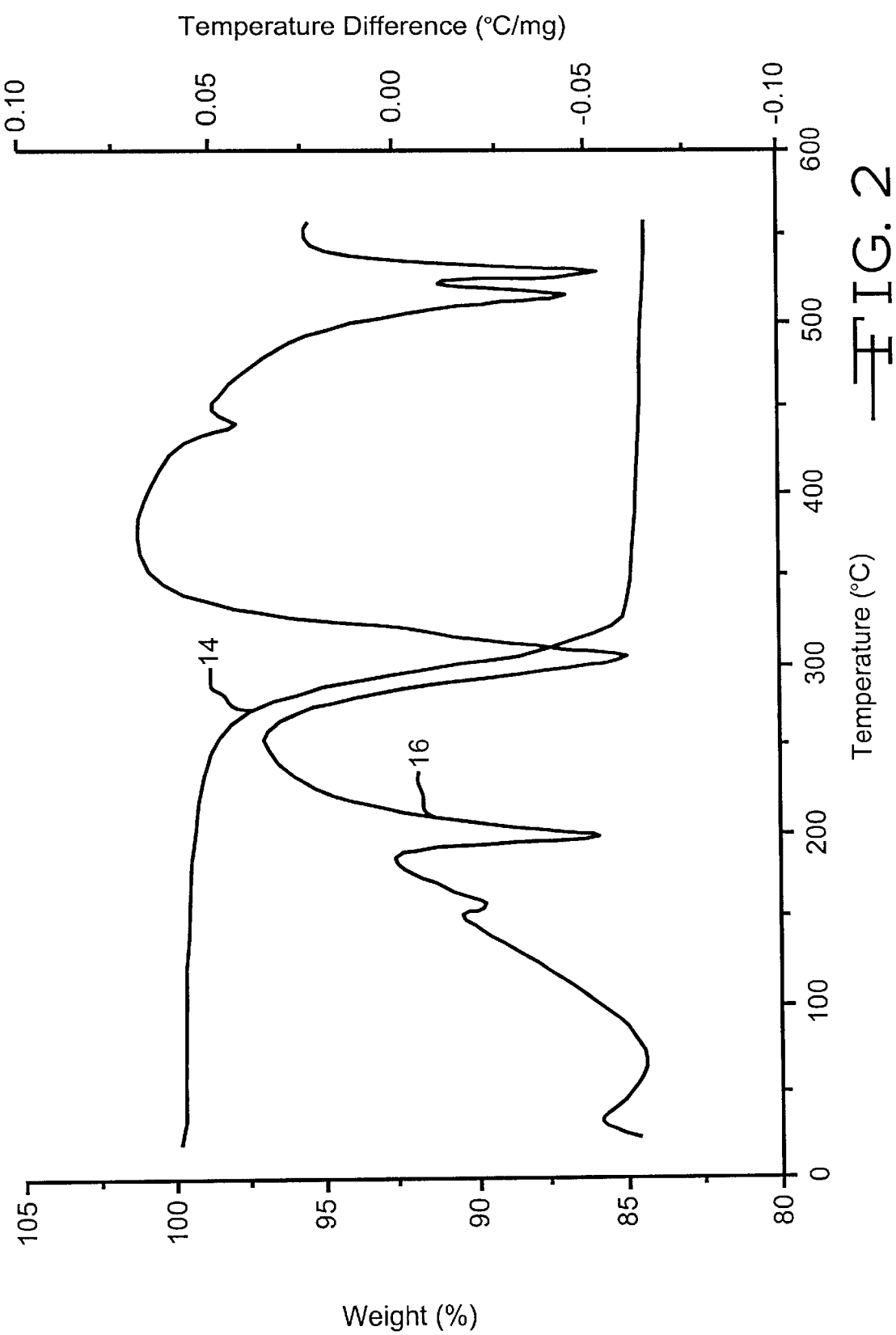
FIG. 2 is a graph constructed from the differential thermal analysis and thermal gravimetric analysis of a mixture of silver nitrate and vanadium oxide.

The preparation of silver vanadium oxide according to the present invention from a mixture of silver nitrate and vanadium oxide is illustrated in FIGS. 1 and 2. In FIG. 1 the melting point of silver nitrate is about 212° C., as indicated by the endotherm in the differential thermal analysis (DTA) curve 10. No weight loss is noted at this temperature in the thermal gravametric analysis (TGA) curve 12. Weight loss begins at about 444° C., i.e., at commencement of the decomposition reaction as evidenced by the evolution of $NO_x$ gas, corresponding to the large endothermic transition in the silver nitrate DTA curve 10 at that temperature. The TGA curve 14 for a mixture of silver nitrate and vanadium pentoxide is shown in FIG. 2. This mixture begins to melt at about 207° C., as shown by the endothermic transition in the DTA curve 16 at this temperature.

According to the present invention, any one of the decomposable starting materials are provided in a melt impregnation mixture which is ground to ensure homogeneity and subsequently thermally treated to provide the novel single phase mixed metal oxide cathode active material. Thus, the melt impregnation step of the present synthesis protocol occurs in an oxygen-containing atmosphere at a temperature of about 28° C. to about 260° C. depending on the decomposable starting material constituent. Then, decomposition heating occurs at a temperature of about 80° C. to about 310° C., again depending on the decomposable starting material constituent. The exact temperature at which melting and decomposition begins is dictated by the starting materials. For a mixture of silver nitrate and vanadium oxide, melt impregnation occurs at about 207° C. Melt impregnation occurs for a mixture of silver carbonate and vanadium oxide at about 189° C. and for a mixture of silver nitrite and vanadium oxide, melt impregnation occurs once heating reaches about 107° C. For a mixture of copper nitrate and vanadium oxide, melt impregnation occurs once the heating temperature reaches about 81° C. and for copper carbonate and vanadium oxide, once heating reaches about 286° C.

Those skilled in this art will readily recognize that various combinations of nitrates, nitrites, carbonates, sulfides and ammonium salts not listed in Table 2 are useful for preparation of single phase metal oxides according to the present invention. These include, but are not limited to, silver lactate and vanadium oxide; silver triflate and vanadium oxide; silver pentafluoropropionate and vanadium oxide; silver laurate and vanadium oxide; silver myristate and vanadium oxide; silver palmitate and vanadium oxide; silver stearate and vanadium oxide; manganese nitrate and vanadium oxide; manganese carbonate and vanadium oxide; manganese nitrite and vanadium oxide; silver sulfide and vanadium oxide; copper(II) sulfide and vanadium oxide; manganese sulfide and vanadium oxide; silver nitrate, manganese nitrate and vanadium oxide; copper nitrate, manganese nitrate and vanadium oxide; silver carbonate, copper carbonate and vanadium oxide; silver carbonate, manganese carbonate and vanadium oxide; copper carbonate, manganese carbonate and vanadium oxide; silver nitrate, copper nitrate and vanadium oxide; silver nitrate, manganese nitrite and vanadium oxide; copper nitrate, manganese nitrate and vanadium oxide; silver sulfide, copper(II) sulfide and vanadium oxide; silver sulfide, manganese sulfide and vanadium oxide; copper sulfide, manganese sulfide and vanadium oxide; silver sulfide, copper nitrate and vanadium oxide; silver sulfide, copper nitrite and vanadium oxide; silver sulfide, copper carbonate and vanadium oxide; silver nitrate, copper sulfide and vanadium oxide; silver nitrate, copper sulfide and vanadium oxide; silver carbonate, copper sulfide and vanadium oxide; silver sulfide, manganese nitrate and vanadium oxide; silver sulfide, manganese nitrite and vanadium oxide; silver sulfide, manganese carbonate and vanadium oxide, and combinations and mixtures thereof.

Those skilled in the art will also understand that Table 2 lists the various reactants in 1:1 mole ratios and their corresponding melting point and decomposition temperature. However, the mole ratio can be changed which will consequently change the melting point and decomposition temperature of the resulting mixtures.

One preferred single phase mixed metal oxide substantially comprises an active material having the general formula $SM_xV_2O_y$ wherein SM is a metal selected from Groups IB to VIIB and VIII of the Periodic Table of Elements and wherein x is about 0.30 to 2.0 and y is about 4.5 to 6.0 in the general formula. By way of illustration, and in no way intended to be limiting, one exemplary single phase cathode active material substantially comprises silver vanadium oxide (SVO) having the general formula $Ag_xV_2O_y$, in any one of its phases, i.e., β-phase silver vanadium oxide having in the general formula x=0.35 and y=5.18, γ-phase silver vanadium oxide having in the general formula x=0.74 and y=5.37 and ε-phase silver vanadium oxide having in the general formula x=1.0 and y=5.5, the latter phase being most preferred.

The preparation technique of a single phase mixed metal oxide according to the present invention produces an active material displaying increased capacity and decreased voltage delay in comparison to a mixed phase metal oxide such as silver vanadium oxide prepared using a decomposition synthesis from $AgNO_3$ and $V_2O_5$ starting materials carried out without a melt impregnation step, such as is disclosed in the previously referenced U.S. Pat. No. 4,391,729 to Liang et al. The discharge capacity and decreased voltage delay of the single phase metal oxide of the present invention is also an improvement over that of silver vanadium oxide typically prepared from $Ag_2O$ and $V_2O_5$ by a chemical addition reaction such as is described in U.S. Pat. No. 5,498,494 to Takeuchi et al., which is assigned to the assignee of the present invention and incorporated herein by reference.

Advantages of the use of this single phase material include increased capacity and decreased voltage delay for pulse discharge applications. An example of such an application is the implantable cardiac defibrillator, where the battery may run under a light load for extended periods of time interrupted by high rate pulse discharge. The occurrence of voltage delay under these conditions is detrimental in that it may shorten device life.

Another preferred single phase composite cathode material is prepared from a homogeneous admixture of vanadium oxide and a second decomposable metal compound, metal or metal oxide and a third decomposable metal compound, metal or metal oxide wherein at least one of the second and third metal constituents is a decomposable form of silver and copper. According to the present invention, the homogeneous admixture is formed from $V_2O_z$ wherein $z \leq 5$ combined with a mixture of either copper nitrate, copper nitrite or an ammonium salt of copper and a silver oxide or, a mixture of copper oxide and silver nitrate, silver nitrite or an ammonium salt of silver to provide the single phase metal oxide having the formula $Cu_xAg_yV_2O_z$ (CSVO), preferably with $x \leq y$. In this preparation technique, the oxide starting materials may include $Ag_2O_2$ wherein $z=2$ to 1 and $CuO_z$ wherein $z=0$ to 1. Thus, this composite cathode active material may be described as a metal-metal oxide-metal oxide, or a metalmetal-metal oxide and the range of material compositions found for $Cu_xAg_yV_2O_0$ is preferably about $0.01 \leq x \leq 1.0$, about $0.01 \leq y \leq 1.0$ and about $5.01 \leq z \leq 6.5$. Another embodiment of the present invention has vanadium oxide combined with both a decomposable compound of silver and copper. Typical single phase forms of CSVO are $Cu_{0.16}Ag_{0.67}V_2O_z$ with z being about 5.5 and $Cu_{0.5}Ag_{0.5}V_2O_z$ with z being about 5.75. U.S. Pat. No. 5,472,810 to Takeuchi et al. and U.S. Pat. No. 5,516,340 to Takeuchi et al. describe the prior art preparation of CSVO.

The above described active materials are formed into an electrode for incorporation into an electrochemical cell by mixing one or more of them with a conductive additive such as acetylene black, carbon black and/or graphite. Metallic powders such as nickel, aluminum, titanium and stainless steel in powder form are also useful as conductive diluents when mixed with the above listed active materials. The cathode electrode further comprises a binder material which is preferably a fluoro-resin powder such as powdered polytetrafluoroethylene (PTFE) or powdered polyvinylidene fluoride (PVDF). More specifically, a preferred mixed phase cathode active material comprises SVO in any one of its many phases, or mixtures thereof, and/or CSVO along with a minor amount of the decomposable reactants mixed with a binder material and a conductive diluent.

A preferred cathode active admixture comprises from about 80% to 99%, by weight, of a cathode active material comprising either one or both of the single phase SVO and CSVO materials prepared according to the melt impregnation decomposition techniques of the present invention and mixed with a suitable binder and a conductive diluent. The resulting blended cathode active mixture may be formed into a free-standing sheet prior to being contacted with a current collector to form the cathode electrode. The manner in which the cathode active mixture is prepared into a free-standing sheet is thoroughly described in U.S. Pat. No. 5,435,874 to Takeuchi et al., which is assigned to the assignee of the present invention and incorporated herein by reference. Further, cathode components for incorporation into an electrochemical cell may also be prepared by rolling, spreading or pressing the mixed phase cathode active mixture of the present invention onto a suitable current collector. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode of the present invention is separated from the Group IA anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include woven and non-woven fabrics of polyolefinic fibers or fluoropolymeric fibers including polyvinylidene fluoride, polyethylenetetrafluoroethylene, and polyethylenechlorotrifluoroethylene laminated or superposed with a polyolefinic or a fluoropolymeric microporous film. Suitable microporous films include a polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.). The separator may also be composed of non-woven glass, glass fiber materials and ceramic materials.

The form of the separator typically is a sheet which is placed between the anode and cathode electrodes and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The electrochemical cell of the present invention further includes a nonaqueous, ionically conductive electrolyte operatively associated with the anode and the cathode electrodes. The electrolyte serves as a medium for migration of ions between the anode and the cathode during the electrochemical reactions of the cell and nonaqueous solvents suitable for the present invention are chosen so as to exhibit those physical properties necessary for ionic transport (low viscosity, low surface tension and wettability). Suitable nonaqueous solvents are comprised of an organic salt dissolved in a nonaqueous solvent and more preferably an alkali metal salt dissolved in a mixture of aprotic organic solvents comprising a low viscosity solvent including cyclic carbonates, cyclic esters and cyclic amides, and mixtures thereof. Low viscosity solvents include tetrahydrofuran (THF), methyl acetate (MA), diglyme, triglyme, tetraglyme, 1,2-dimethoxyethane (DME), 1,2-diethoxyethane (DEE), 1-ethoxy,2-methoxyethane (EME), dimethyl carbonate (DMC), diethyl carbonate (DEC), dipropyl carbonate (DPC), ethyl methyl carbonate (EMC), methyl propyl carbonate (MPC) and ethyl propyl carbonate (EPC), and mixtures thereof. High permittivity solvents include propylene carbonate (PC), ethylene carbonate (EC), butylene carbonate (BC), acetonitrile, dimethyl sulfoxide, dimethyl formamide, dimethyl acetamide, γ-butyrolactone (GBL) and N-methyl-pyrrolidinone (NMP), and mixtures thereof.

The preferred electrolyte comprises an inorganic alkali metal salt, and in the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiAlCl_4$, $LiGaCl_4$, $LiC(SO_2CF_3)$, $LiN(SO_2CF_3)_2$, $LiSCN$, $LiO_2$, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof. Suitable salt concentrations typically range between about 0.8 to 1.5 molar, and a preferred electrolyte for a lithium/transition metal oxide electrochemical cell includes $LiAsF_6$ or $LiPF_6$ dissolved in a 50:50 mixture, by volume, of PC and DME.

The preferred form of the electrochemical cell is a case-negative design wherein the anode/cathode couple is inserted into a conductive metal casing such that the casing is connected to the anode current collector in a case-negative configuration, as is well known to those skilled in the art. A preferred material for the casing is titanium although stainless steel, mild steel, nickel-plated mild steel and aluminum are also suitable. The casing header comprises a metallic lid having a sufficient number of openings to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described herein above and hermetically sealed such as by close-welding a stainless steel plug over the fill hole, but not limited thereto. The cell of the present invention can also be constructed in a case-positive design.

The following examples describe the manner and process of an electrochemical cell according to the present invention, and they set forth the best mode contemplated by the inventors for carrying out the invention, but they are not to be construed as limiting.

EXAMPLE I

A silver vanadium oxide cathode active material was synthesized by the melt impregnation decomposition technique of the present invention as outlined below in Protocol 1. The starting materials consisted of silver nitrate and vanadium pentoxide in a 1:1 mole ratio. The starting materials were first thoroughly mixed to ensure homogeneity. The homogeneous mixture was then heated as follows:

| Protocol 1 | |
| --- | --- |
| Step 1 | Heated mixture to above the melting temperature of silver nitrate, i.e., to about 220° C. for about 5 to 16 hours. |
| Step 2 | Cooled the resulting admixture to room temperature and ground thoroughly. |
| Step 3 | Heated admixture to 230° C. for 30 min. |
| Step 4 | Heated admixture to 260° C. for 2 hours. |
| Step 5 | Heated admixture to 300° C. for 16 hours. |
| Step 6 | Cooled admixture to room temperature and ground thoroughly. |
| Step 7 | Heated admixture at 450° C. for 12 to 48 hours. |

Figure 3:
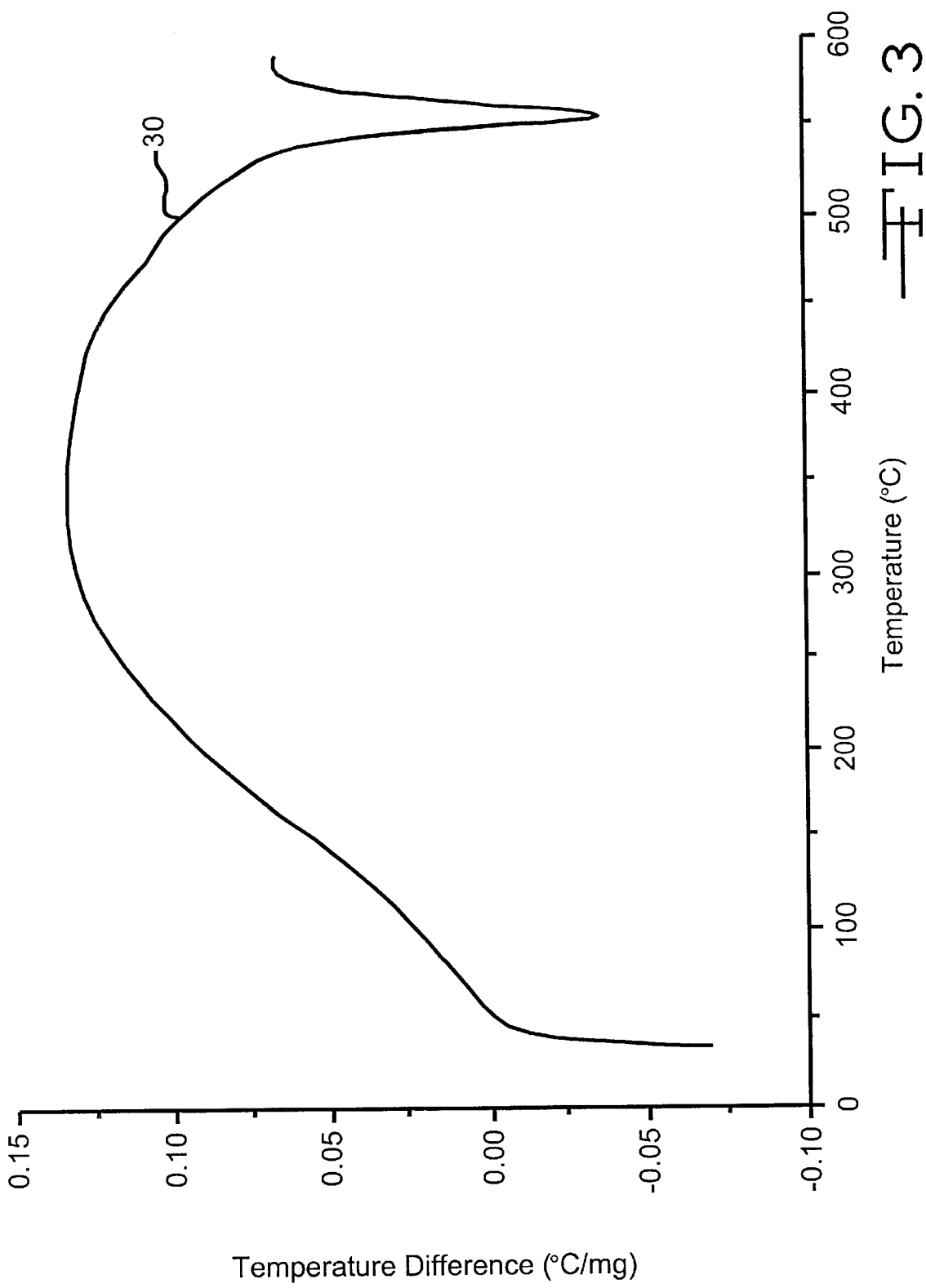
FIG. 3 is a graph constructed from the differential thermal analysis of a single phase silver vanadium oxide produced by the melt impregnation process of the present invention.

According to the present invention, a heating step at 220° C. for 5 to 16 hours is included in the melt impregnation decomposition technique. This step allows the silver nitrate to melt and flow throughout and within the vanadium-containing material. Cooling and grinding following this step is also critical in mixing the starting constituents prior to decomposition of the silver salt. The thermal decomposition of $AgNO_3$ begins at a temperature of about 230° C., and $NO_x$ gas is liberated until a temperature of about 300° C. Silver vanadium oxide synthesized by this technique was thermally analyzed by differential thermal analysis (DTA) and the results are presented in FIG. 3. The DTA curve 30 displays a single endotherm assigned to ε-phase SVO.

COMPARATIVE EXAMPLE I

For comparison, silver vanadium oxide was prepared by the synthesis method described in the previously referenced U.S. Pat. No. 5,695,892 to Leising et al. and as set forth in protocol 2 below.

| Protocol 2 | |
| --- | --- |
| Step 1 | Heated mixture to 230° C. for 30 min. |
| Step 2 | Heated mixture to 260° C. for 2 hours. |
| Step 3 | Heated mixture to 300° C. for 16 hours. |
| Step 4 | Cooled mixture to room temperature and ground thoroughly. |
| Step 5 | Heated mixture to 450° C. for 12 to 48 hours. |

Figure 4:
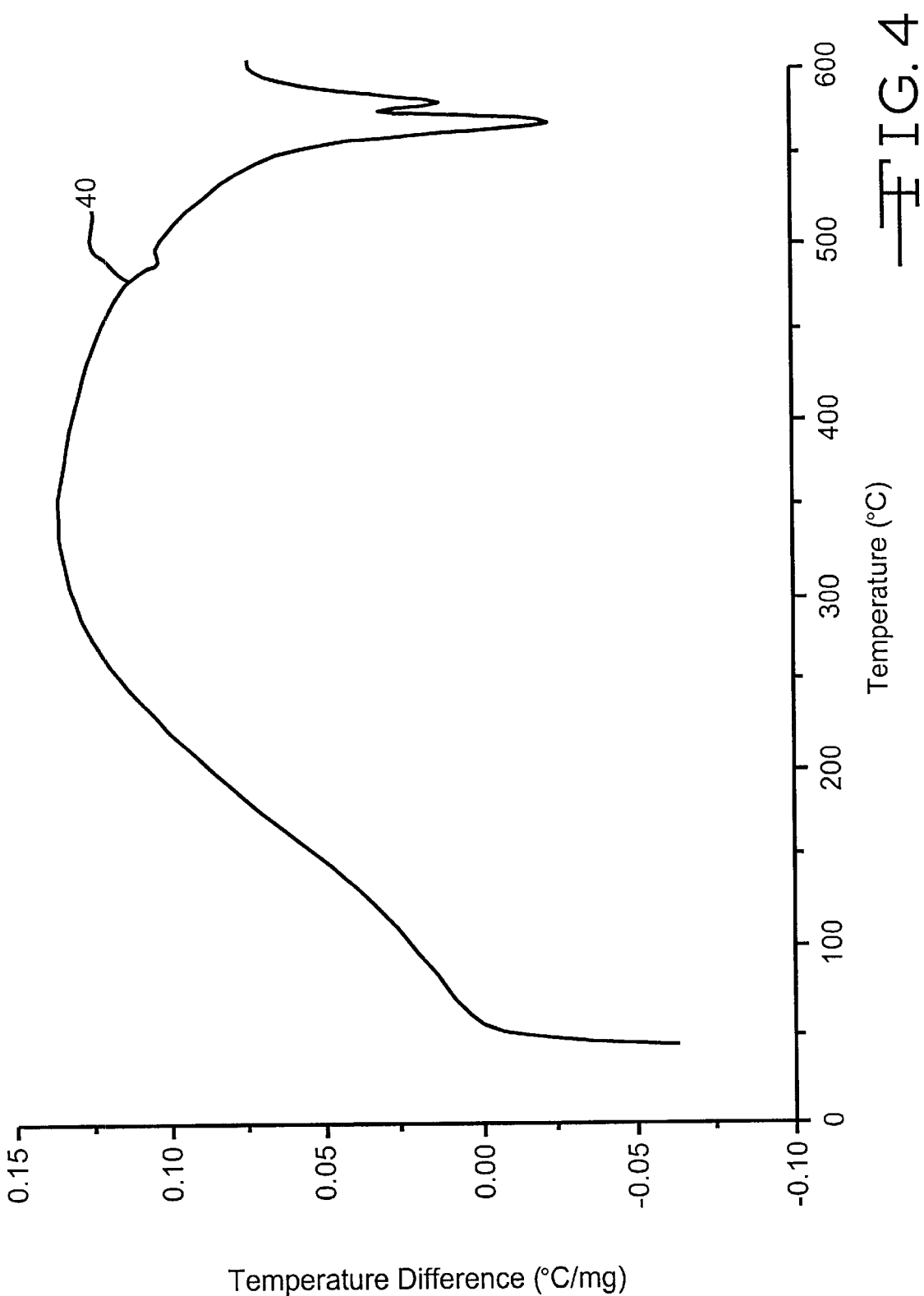
FIGS. 4 to 7 are graphs constructed from the differential thermal analysis of various mixed phase silver vanadium oxide materials produced by the prior art.

As previously described, thermal decomposition of silver nitrate begins at about 230° C. So, in Comparative Example I the synthesis technique begins by heating the starting materials to the decomposition temperature without first causing the decomposable constituent to melt. Silver vanadium oxide synthesized by this prior art technique was also thermally analyzed by differential thermal analysis (DTA) and the results are presented by in FIG. 4. In contrast to the material prepared by the melt impregnation technique of the present invention, the DTA curve 40 for this prior art SVO contains isotherms assigned to the presence of $AgVO_3$ and $Ag_{0.74}V_2O_{5.37}$ as well as the desired ε-phase SVO.

COMPARATIVE EXAMPLE II

Figure 5:
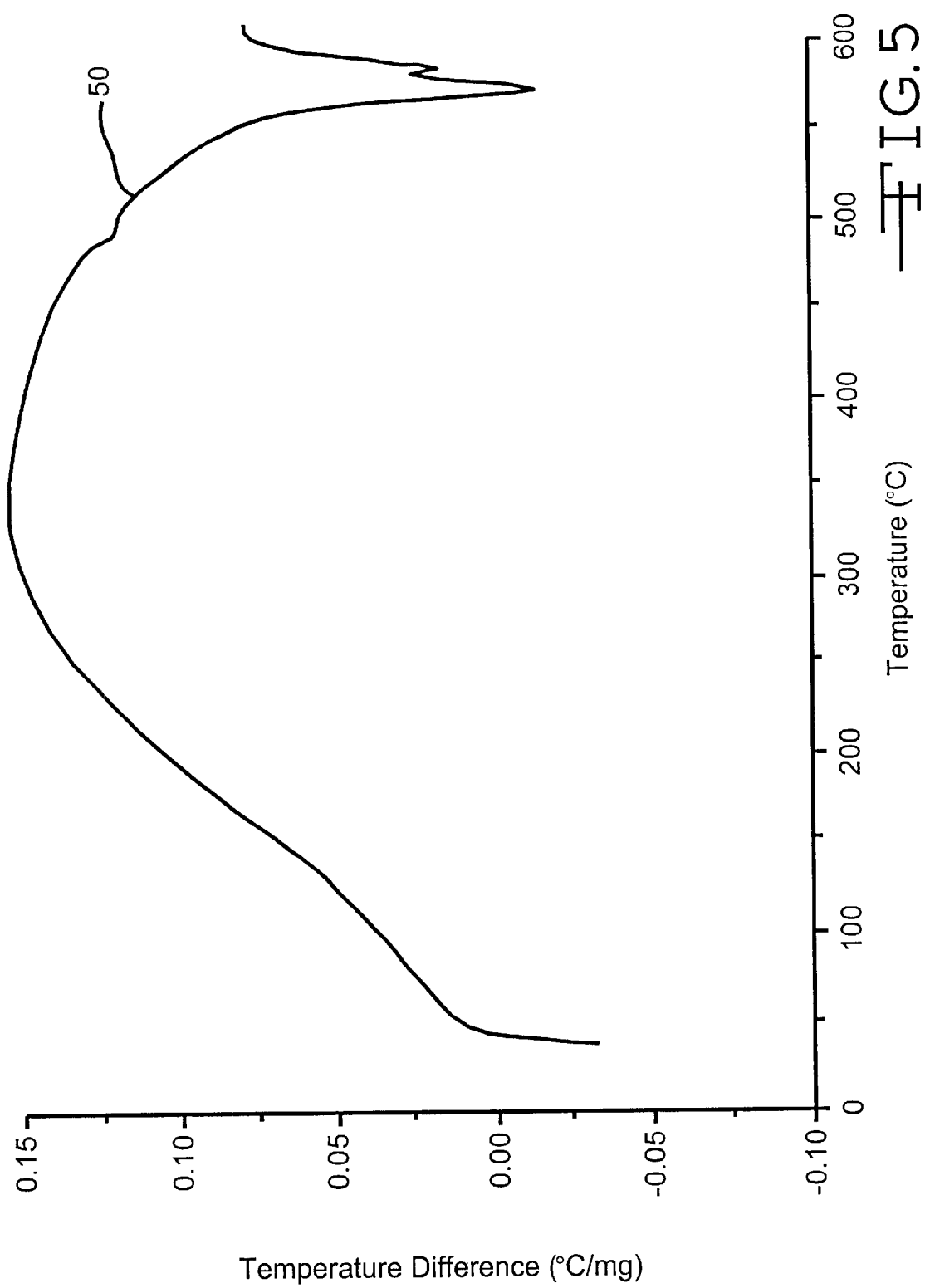

In another comparative example, silver vanadium oxide was prepared under conditions identical to the preferred embodiment (Protocol 1) except the homogeneous mixture of starting materials was not initially heated to 220° C. to melt the silver nitrate prior to grinding the sample before the 230° C. thermal treatment step. Thus, step 1 was removed from the synthetic protocol of the present invention while all the remaining steps were completed for this comparative example. The DTA curve 50 of the resulting silver vanadium oxide material is illustrated in FIG. 5, and displays multiple peaks indicating a mixture of phases.

COMPARATIVE EXAMPLE III

Figure 6:
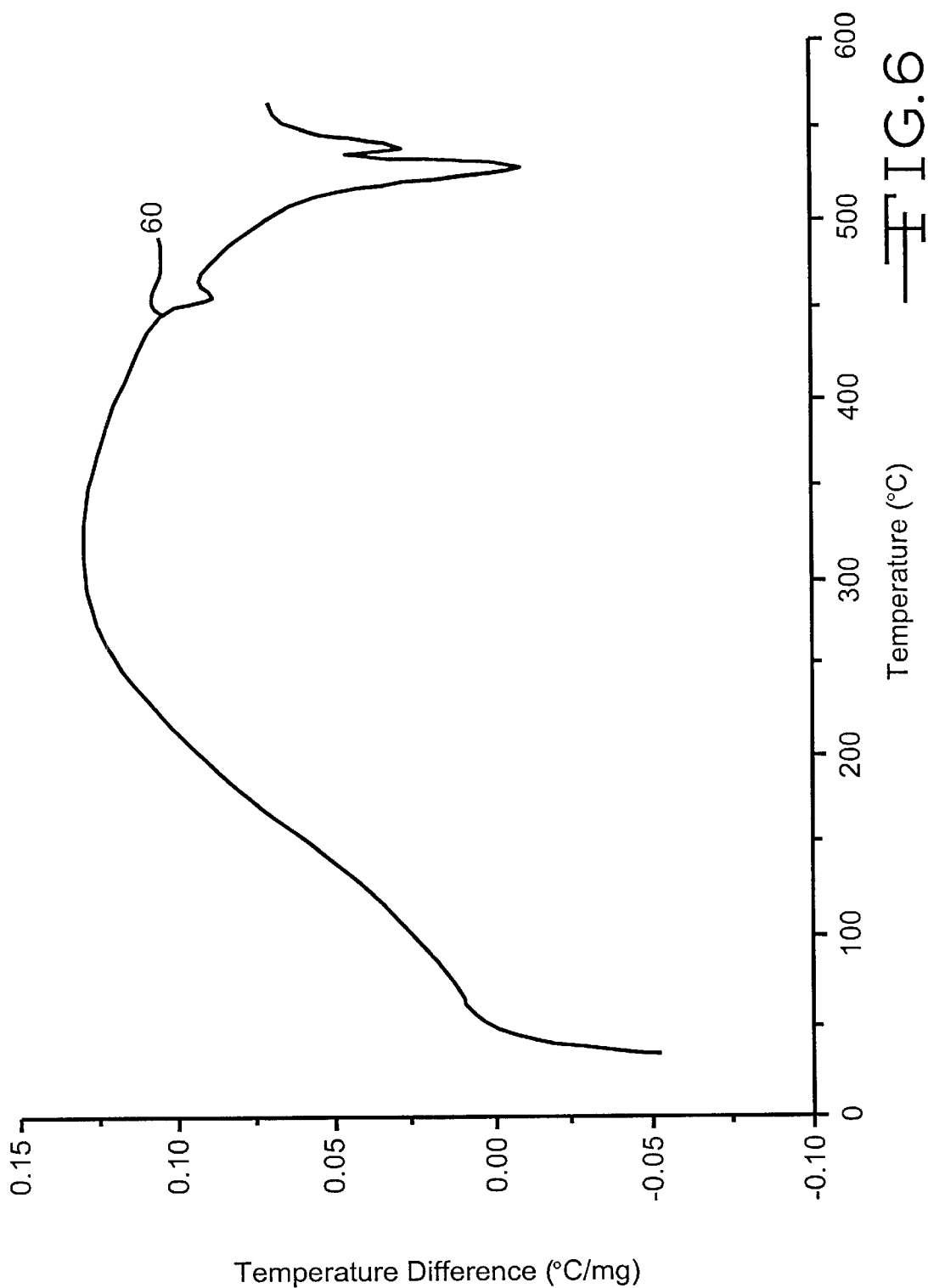

Silver vanadium oxide starting materials similar to those used in Example I were heated to 220° C. for 16 hours, followed by directly heating the material to 230° C. This comparative example eliminated the grinding step (step 2) from Protocol 1 of the present invention. The DTA curve 60 of this comparative silver vanadium oxide material is shown in FIG. 6, and again displays multiple isotherms resulting from a mixed phase SVO material.

COMPARATIVE EXAMPLE IV

Figure 7:
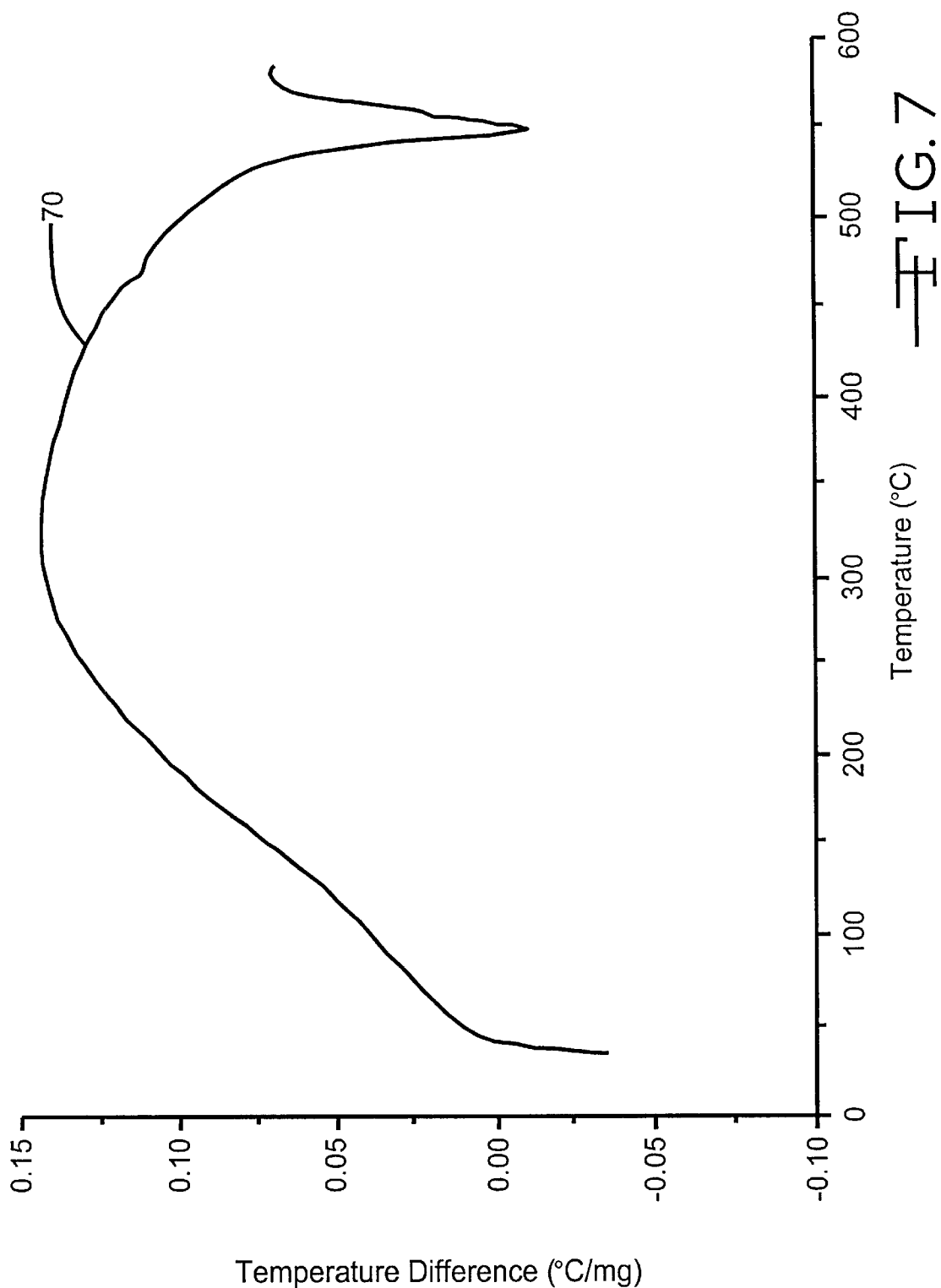

Silver vanadium oxide was prepared according to Protocol 1 of the present inventions, except that the heat treatment in step 1 of this comparative example was set to 184° C., below the melting point of silver nitrate. The DTA curve 70 for the resulting material is shown in FIG. 7, and indicates the presence of a mixed phase SVO material.

While the synthesis of silver vanadium oxide from the reaction of $V_2O_5$ and $AgNO_3$ has been detailed in the above examples, any one of the numerous starting materials detailed hereinabove can be used in the melt impregnation decomposition synthesis of the present invention to provide a product single phase mixed metal oxide.

It is appreciated that various modifications to the present inventive concepts described herein may be apparent to those of ordinary skill in the art without departing from the spirit and scope of the present invention as defined by the herein appended claims.

What is claimed:

1. An electrochemical cell having an anode, a cathode comprising a substantially single phase mixed metal oxide contacted to a cathode current collector, and an ionically conductive electrolyte activating the anode and the cathode, wherein the substantially single phase mixed metal oxide is characterized as having been formed by a process comprising the sequential steps of:
   a) forming a substantially homogeneous mixture of starting materials comprising a metal oxide and at least one decomposable metal-containing constituent, wherein the homogeneous mixture is formed at a mixing temperature below a melting temperature of the mixture;
   b) heating the mixture to above a melting temperature of the decomposable metal-containing constituent, but below its decomposition temperature, to cause the metal-containing constituent to melt and flow throughout and within the mixture;
   c) grinding the resulting melt impregnated admixture to ensure homogeneity before heating the admixture to the decomposition temperature;
   d) heating the ground admixture to a second temperature at least as high as the decomposition temperature of the admixture to provide the single phase mixed metal oxide; and
   e) utilizing the thusly produced substantially single phase mixed metal oxide.

2. The electrochemical cell of claim 1 wherein the metal oxide is vanadium oxide and the metal-containing constituent is selected from the group consisting of silver nitrate, silver lactate, silver triflate, silver pentafluoropropionate, silver laurate, silver myristate, silver palmitate, silver stearate, and mixtures thereof.

3. An electrochemical cell having an anode, a cathode comprising a substantially single phase mixed metal oxide contacted to a cathode current collector, and an ionically conductive electrolyte activating the anode and the cathode, wherein the substantially single phase mixed metal oxide is characterized as having been formed by a process comprising the sequential steps of:
   a) forming a substantially homogeneous mixture of starting materials comprising at least vanadium oxide and at least one decomposable silver-containing constituent, wherein the homogeneous mixture is formed at a mixing temperature below a melting temperature of the mixture;
   b) heating the mixture to above a melting temperature of the decomposable silver-containing constituent, but below its decomposition temperature, to cause the silver-containing constituent to melt and flow throughout and within the mixture;
   c) grinding the resulting melt impregnated admixture to ensure homogeneity before heating the admixture to the decomposition temperature;
   d) heating the ground admixture to a second temperature at least as high as the decomposition temperature of the admixture to provide the single phase mixed metal oxide; and
   e) utilizing the thusly produced substantially single phase mixed metal oxide.

4. The electrochemical cell of claim 3 wherein the silver-containing constituent is silver nitrate and the melt impregnated admixture is formed at the melting temperature of about 220° C.

5. The electrochemical cell of claim 3 wherein the decomposed admixture is characterized as having been heated to an elevated temperature above the second temperature to provide the single phase mixed metal oxide.

6. The electrochemical cell of claim 3 wherein after heating to the melting temperature, the melt impregnated admixture is cooled to room temperature prior to subsequent heating.

7. The electrochemical cell of claim 3 wherein after heating to the second temperature to decompose the admixture, the resulting single phase mixed metal oxide is cooled to room temperature before being utilized.

8. The electrochemical cell of claim 3 wherein the heating occurs in an oxygen-containing atmosphere.

9. The electrochemical cell of claim 3 wherein the single phase mixed metal oxide has the general formula $Ag_2V_4O_{11}$.

10. The electrochemical cell of claim 3 wherein the single phase mixed metal oxide has the general formula $Cu_{0.16}Ag_{0.67}V_2O_z$ with z being about 5.5 or $Cu_{0.5}Ag_{0.5}V_2O_z$ with z being about 5.75.

11. The electrochemical cell of claim 3 wherein the cathode further comprises at least one of a binder material and a conductive additive.

12. The electrochemical cell of claim 3 wherein the anode is comprised of a Group IA metal.

13. The electrochemical cell of claim 3 wherein the anode comprises lithium and the electrolyte includes a lithium salt selected from the group consisting of $LiPF_6$, $LiAsF_6$, $LiSbF_6$, $LiBF_4$, $LiClO_4$, $Li_2O$, $LiAlCl_4$, $LiGaCl_4$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

14. The electrochemical cell of claim 3 wherein the electrolyte is of a nonaqueous chemistry comprising an organic solvent selected from the group consisting of tetrahydrofuran, propylene carbonate, dimethyl carbonate, diethyl carbonate, methyl acetate, acetonitrile, dimethyl sulfoxide, dimethyl formamide, dimethyl acetamide, γ-butyrolactone, N-methyl-pyrrolidinone, ethylene carbonate, diglyme, triglyme, tetraglyme, 1,2-dimethoxyethane, and mixtures thereof.

15. A cathode for an electrochemical cell, the cathode comprising a single phase mixed metal oxide characterized as having been formed from starting materials including a metal oxide and at least one decomposable silver-containing constituent provided in a substantially homogeneous mixture, wherein the homogenous mixture of starting materials is formed at a mixing temperature below a melting temperature of the mixture, and wherein after the initial homogenization mixing of the starting materials, the single phase mixed metal oxide is characterized as formed from the homogenized mixture heated to above a melting temperature of the decomposable silver-containing constituent, but below its decomposition temperature, to cause the silver-containing constituent to melt and flow throughout and within the resulting melt impregnated admixture followed by having been ground before heating the admixture to the decomposition temperature to ensure homogeneity and then heated to a second temperature at least as high as the decomposition temperature of the admixture to provide the single phase mixed metal oxide, and wherein the single phase mixed metal oxide is contacted to a cathode current collector to form the cathode.

16. The cathode of claim 15 wherein the silver-containing constituent is silver nitrate and the substantially homogeneous mixture is formed at the melting temperature of about 220° C.

17. The cathode of claim 16 wherein the second temperature is about 280° C. or higher, and the elevated temperature is about 375° C. or higher.

18. The cathode of claim 15 wherein after heating to the melting temperature, the melt impregnated admixture is cooled to room temperature prior to subsequent heating.

19. The cathode of claim 15 wherein after heating to the second temperature to decompose the admixture, the resulting single phase mixed metal oxide material is cooled to room temperature before being utilized.

20. The cathode of claim 15 wherein the silver-containing constituent is selected from the group consisting of silver nitrate, silver lactate, silver triflate, silver pentafluoropropionate, silver laurate, silver myristate, silver palmitate, silver stearate, and mixtures thereof.

21. The cathode of claim 15 wherein the heating occurs in an oxygen-containing atmosphere.

22. The cathode of claim 15 wherein the single phase mixed metal oxide has the general formula $Ag_2V_4O_{11}$.

23. A method for providing an electrochemical cell, which comprises:
  a) providing a casing;
  b) housing the electrochemical cell within the casing, comprising the steps of:
    i) providing an anode;
    ii) providing a cathode, comprising the steps of: mixing vanadium oxide with at least one decomposable silver-containing constituent to provide a substantially homogeneous mixture, wherein the homogeneous mixture is formed at a mixing temperature below a melting temperature of the decomposable silver-containing constituent; heating the mixture to above a melting temperature of the decomposable silver-containing constituent, but below its decomposition temperature, to cause the silver-containing constituent to melt and flow throughout and within the mixture; grinding the resulting melt impregnated admixture to ensure homogeneity before heating the admixture to the decomposition temperature; heating the ground admixture to a second temperature at least as high as the decomposition temperature of the admixture to provide the single phase mixed metal oxide; and contacting the single phase mixed metal oxide to a current collector; and
    iii) positioning the anode and the cathode inside the casing; and
  c) activating the anode and the cathode with an electrolyte provided in the casing.

24. The method of claim 23 wherein the silver-containing constituent is silver nitrate and including heating the substantially homogeneous mixture to the melting temperature of about 220° C.

25. The method of claim 23 including heating the decomposed admixture to an elevated temperature above the second temperature to provide the single phase mixed metal oxide.

26. The method of claim 23 wherein after heating to the melting temperature, the melt impregnated admixture is cooled to room temperature prior to subsequent heating.

27. The method of claim 23 including after heating to the second temperature to decompose the admixture, the resulting single phase mixed metal oxide is cooled to room temperature before being utilized.

28. The method of claim 23 wherein the silver-containing constituent is selected from the group consisting of silver nitrate, silver lactate, silver triflate, silver pentafluoropropionate, silver laurate, silver myristate, silver palmitate, silver stearate, and mixtures thereof.

29. The method of claim 23 including conducting the heating in an oxygen-containing atmosphere.

30. The method of claim 23 wherein the single phase metal oxide has the general formula $Ag_2V_4O_{11}$.

31. The method of claim 23 including providing the anode comprised of a Group IA metal.

32. A method for providing a cathode for an electrochemical cell, the cathode comprising a substantially unitary phase metal oxide, which method comprises:
  a) mixing a metal oxide with at least one decomposable silver-containing constituent to provide a substantially homogeneous mixture, wherein the homogeneous mixture is formed at a mixing temperature below a melting temperature of the silver-containing constituent;
  b) heating the mixture to above a melting temperature of the decomposable silver-containing constituent, but below its decomposition temperature, to cause the silver-containing constituent to melt and flow throughout and within the mixture;
  c) grinding the resulting melt impregnated admixture to ensure homogeneity before heating the admixture to the decomposition temperature;
  d) heating the ground admixture to a second temperature at least as high as the decomposition temperature of the admixture to provide the single phase mixed metal oxide; and
  e) forming the thusly produced single phase metal oxide into the cathode.

33. The method of claim 32 wherein the silver-containing is silver nitrate and including heating the substantially homogeneous mixture to the melting temperature of about 220° C.

34. The method of claim 32 including heating the decomposed admixture to an elevated temperature to provide the single phase mixed metal oxide.

35. The method of claim 32 including after heating to the melting temperature, the melt impregnated admixture is cooled to room temperature prior to subsequent heating.

36. The method of claim 32 including after heating to the second temperature to decompose the admixture, the resulting single phase mixed metal oxide is cooled to room temperature before being utilized.

37. The method of claim 32 wherein the silver-containing constituent is selected from the group consisting of silver nitrate, silver lactate, silver triflate, silver pentafluoropropionate, silver laurate, silver myristate, silver palmitate, silver stearate, and mixtures thereof.

38. The method of claim 32 including heating in an oxygen-containing atmosphere.

39. The electrochemical cell of claim 1 wherein the decomposed admixture is characterized as having been heated to an elevated temperature above the second temperature to provide the single phase mixed metal oxide.

40. The electrochemical cell of claim 5 wherein the second temperature is about 280° C. or higher, and the elevated temperature is about 375° C. or higher.

41. The cathode of claim 15 wherein the decomposed admixture is characterized as having been heated to an elevated temperature above the second temperature to provide the single phase mixed metal oxide.

42. The electrochemical cell of claim 3 wherein the metal-containing constituent is selected from the group consisting of silver nitrate, silver lactate, silver triflate, silver pentafluoropropionate, silver laurate, silver myristate, silver palmitate, silver stearate, and mixtures thereof.

43. The method of claim 25 wherein the second temperature is about 280° C. or higher, and the elevated temperature is about 375° C. or higher.

44. The method of claim 34 wherein the second temperature is about 280° C. or higher, and the elevated temperature is about 375° C. or higher.

45. An electrochemical cell having an anode, a cathode comprising a substantially single phase mixed metal oxide contacted to a cathode current collector, and an tonically conductive electrolyte activating the anode and the cathode, wherein the substantially single phase mixed metal oxide is characterized as having been formed by a process comprising the sequential steps of:

a) forming a substantially homogeneous mixture of starting materials comprising a metal oxide and at least one decomposable silver-containing constituent selected from the group consisting of silver nitrate, silver lactate, silver triflate, silver pentafluoropropionate, silver laurate, silver myristate, silver palmitate, silver stearate, and mixtures thereof, wherein the homogeneous mixture is formed at a mixing temperature below a melting temperature of the mixture;

b) heating the mixture to above a melting temperature of the decomposable silver-containing constituent, but below its decomposition temperature, to cause the silver-containing constituent to melt and flow throughout and within the mixture;

c) grinding the resulting melt impregnated admixture to ensure homogeneity before heating the admixture to the decomposition temperature;

d) heating the ground admixture to a second temperature at least as high as the decomposition temperature of the admixture; and e) utilizing the thusly produced substantially single phase mixed metal oxide.

* * * * *